United States Patent [19]

Okushima

[11] Patent Number: 5,194,195
[45] Date of Patent: Mar. 16, 1993

[54] METHOD OF CONTROLLING INJECTION MOLDING MACHINE BY USE OF NOZZLE RESIN PRESSURES

[75] Inventor: Yoshikatsu Okushima, Chiba, Japan

[73] Assignee: Sumitomo Heavy Industries, Ltd., Tokyo, Japan

[21] Appl. No.: 882,162

[22] Filed: May 12, 1992

[30] Foreign Application Priority Data

May 14, 1991 [JP] Japan .................. 3-109049

[51] Int. Cl.$^5$ .............................. B29C 45/77
[52] U.S. Cl. ................. 264/40.1; 264/328.1; 425/145; 425/149
[58] Field of Search .............. 264/40.1, 40.5, 328.1, 264/328.13; 425/135, 145, 146, 149

[56] References Cited

U.S. PATENT DOCUMENTS 4,952,364  8/1990  Matsuda et al. ............... 264/40.1

FOREIGN PATENT DOCUMENTS 57-59060  12/1982  Japan .
58-52486  11/1983  Japan .
2-81617   3/1990   Japan .

*Primary Examiner*—Jill L. Heitbrink
*Attorney, Agent, or Firm*—Nikaido, Marmelstein, Murray & Oram

[57] ABSTRACT

A method of controlling an injection molding machine by use of nozzle resin pressures in which resin is directly controlled to thereby enable highly accurate control, and a conventional mold can be utilized as it is.

After metering a dose of resin, a resin pressure at the upstream side of a nozzle switching valve is detected while the nozzle switching valve is kept closed, and a pre-load is applied on the resin by controlling an injection cylinder. Subsequently, the nozzle switching valve is opened, and injection of the resin is performed, then applying a dwell pressure on the resin in the mold. During the injection and dwell pressure application steps, a resin pressure at the downstream side of the nozzle switching valve is detected, and the injection cylinder and the nozzle switching valve are controlled. In these steps, the resin to be filled is directly controlled, and therefore, the control can be carried out highly accurately. After the dwell pressure application step, the nozzle switching valve is closed. Then, the resin pressure at the upstream side of the nozzle switching valve is detected, and a back pressure is applied on the resin at the front end of a screw feeder by controlling the injection cylinder.

1 Claim, 2 Drawing Sheets

METHOD OF CONTROLLING INJECTION MOLDING MACHINE BY USE OF NOZZLE RESIN PRESSURES

BACKGROUND OF THE INVENTION

1. Field of the Invention

The present invention relates to a method of controlling an injection molding machine by use of pressures of resin in a nozzle.

2. Description of the Prior Art

Conventionally, in an injection molding machine, a screw feeder which is rotatable and movable forwardly and backwardly is provided in a heating cylinder and actuated by a drive system including an injection cylinder, a hydraulic motor and so forth.

Prior to the injection, resin metering is first conducted, and the screw feeder is retracted while it is rotated. At the same time, resin supplied from a hopper into the heating cylinder is heated by the heating cylinder, moved forwardly in accordance with the retraction of the screw feeder, and stored at the front end of the screw feeder.

Subsequently, when the screw feeder is advanced, the resin stored at the front end of the screw feeder is injected from an injection nozzle and filled in a cavity in a mold. Then, after the injection is completed, the resin in the cavity is cooled down and shaped as a molding product. At the same time, however, the resin is contracted, with cooling thereof.

In consequence, even after the injection is completed, a dwell pressure is applied on the resin in the mold cavity to thereby compensate for the contraction. Then, after the dwell pressure application step is over, the screw feeder is rotated again to start the metering step.

By the way, in the molding cycle comprising the above-described steps, an advancing and retracting speed, a rotational speed and a back pressure of the screw feeder, a hydraulic pressure, and the like are detected, and feedback of these detected values is conducted to thereby control the injection molding machine.

For example, there has conventionally been proposed a method in which a screw feeder is controlled in injection and dwell pressure application steps of injection molding, and a flow and a pressure of the resin are indirectly controlled by regulating pressures and speeds of the screw feeder at the respective positions while it advances (see Japanese Patent Examined Publication No. 57-59060).

Also, there has been proposed a method in which a resin pressure sensor is installed in a passage for resin in a mold, and an amount and a pressure of fluid supplied to an injection cylinder are controlled so that a transition of a detected resin pressure will be the same as a predetermined wave form of a pressure inside the mold (see Japanese Patent Examined Publication No. 58-52486).

Further, there has been proposed a method in which a nozzle valve is provided on the distal end of an injection nozzle, and in an injection step, resin in a heating cylinder is injected when opening the nozzle valve after compressing the resin until the advancing speed of a screw feeder becomes a certain value or less (see Japanese Patent Unexamined Publication No. 2-81617).

However, in the first one of the above-described conventional control methods of injection molding machines, an amount and a pressure of fluid supplied to an injection cylinder are actually controlled. But the screw feeder merely presses the resin. It is the resin that actually moves, and the resin stored at the front end of the screw feeder is injected from an injection nozzle, passed through a sprue, runners, a gate and so forth of a mold, and filled in a cavity. The molten resin is viscous, elastic compressed fluid, and consequently, however accurately the screw feeder is controlled, there are large fluctuations in a density of the resin at the front end of the screw feeder, a back flow amount in a screw feeder head portion, timing of injecting the resin from the tip of the injection nozzle, time for the resin to reach the gate, timing of passing the resin through the gate, time for filling the resin in the cavity, and so forth.

Moreover, in the second control method, since the resin is directly controlled, the control can be performed highly accurately. However, if there is a fluctuation in the density of the resin stored at the front end of an injection nozzle, it affects the control. Besides, since the resin pressure sensor must be installed in the mold, it is difficult to utilize conventional molds in stock at a molding site.

Furthermore, in the third control method, the resin is injected after its density is made uniform by compressing the resin by use of the nozzle valve, and therefore, a favorable molding density can be obtained. However, it is similar to the first control method in that because the screw feeder is an object to be controlled, the control can not be performed highly accurately.

SUMMARY OF THE INVENTION

It is therefore an object of the present invention to solve the problems of the conventional control methods of injection molding machines described above and to provide a method of controlling an injection molding machine by use of nozzle resin pressures in which resin is directly controlled to thereby enable highly accurate control, and a conventional mold can be utilized as it is.

In order to achieve this object, in the method of controlling the injection molding machine by use of nozzle resin pressures according to the invention, a screw feeder which is rotatable and movable forwardly and backwardly is provided in a heating cylinder and actuated by an injection cylinder. An injection nozzle for filling up a mold with resin is provided on the distal end of the heating cylinder, and a nozzle switching valve is provided inside of the injection nozzle.

Sensors for detecting resin pressures are installed at the upstream and downstream sides of the nozzle switching valve. On the basis of the resin pressures detected by the resin pressure sensors, the stroke of the injection cylinder and the opening degree of the nozzle switching valve are regulated.

In the injection molding machine of the above-described structure, after metering a dose of resin by moving the screw feeder backwardly while rotating it, a resin pressure at the upstream side of the nozzle switching valve provided on the distal end of the injection nozzle is detected while the nozzle switching valve is kept closed, and a pre-load is applied on the resin at the front end of the screw feeder by controlling the injection cylinder so that a transition of the detected resin pressure will have substantially the same wave form as a predetermined one.

Subsequently, the nozzle switching valve is opened, and the screw feeder is advanced so as to press and inject the resin into the mold. After the injection, a dwell pressure is applied on the resin as received in the mold. During the injection and dwell pressure application steps, an amount and a pressure of fluid supplied to the injection cylinder and an opening degree of the nozzle switching valve are regulated so that a transition of a resin pressure at the downstream side of the nozzle switching valve will have substantially the same wave form as a predetermined one.

After the dwell pressure application step, the nozzle switching valve is closed. Then, the resin pressure at the upstream side of the nozzle switching valve is detected while the nozzle switching valve is kept closed, and a back pressure is applied on the resin at the front end of the screw feeder by controlling the injection cylinder so that a transition of the detected resin pressure will have substantially the same wave form as a predetermined one.

According to the invention, as described above, after moving the screw feeder rotatingly backwardly to meter a dose of resin, a resin pressure at the upstream side of the nozzle switching valve provided on the distal end of the injection nozzle is detected with the nozzle switching valve being kept closed. Then, by controlling the injection cylinder in such a way that a transition of the detected resin pressure will have substantially the same wave form as a predetermined one, a pre-load is applied on the resin at the front end of the screw feeder. At this time, the density of the resin stored at the front end of the screw feeder will be uniform, not fluctuating, due to the pre-load applied on it.

Next, when opening the nozzle switching valve and advancing the screw feeder, the resin is pressed and injected into the mold. The dwell pressure is applied on the resin in the mold after the injection. During the injection and dwell pressure application steps, an amount and a pressure of fluid supplied to the injection cylinder and an opening degree of the nozzle switching valve are regulated in such a way that a transition of a resin pressure at the downstream side of the nozzle switching valve will have substantially the same wave form as a predetermine done. In these steps, the resin to be filled is directly controlled, and therefore, the control can be performed highly accurately.

The nozzle switching valve is closed after the dwell pressure application step, and the resin pressure at the upstream side of the nozzle switching valve is detected while the nozzle switching valve is kept closed. Then, by controlling the injection cylinder in such a way that a transition of the detected resin pressure will have substantially the same wave form as a predetermined one, a back pressure is applied on the resin at the front end of the screw feeder.

DETAILED DESCRIPTION OF THE PREFERRED EMBODIMENT

One embodiment of the present invention will be hereinafter described in detail with reference to the attached drawings.

Figure 1:
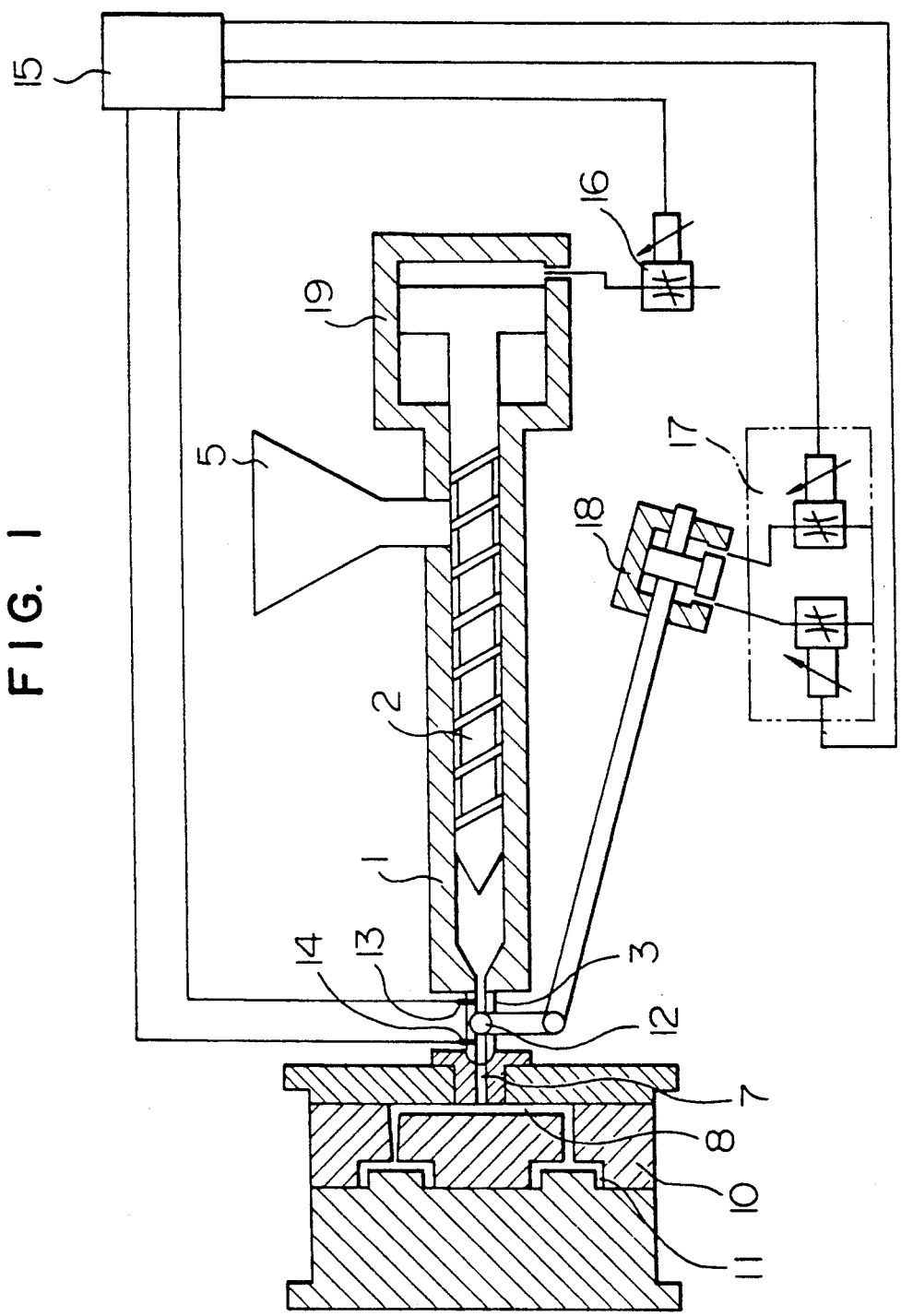
FIG. 1 is a cross-sectional view of an injection molding machine in which a control method by use of nozzle resin pressures according to the present invention is employed.

FIG. 1 is a cross-sectional view of an injection molding machine in which a control method by use of pressures of resin in a nozzle according to the invention is employed.

Referring to the figure, a screw feeder 2 rotatable and movable backwardly and forwardly is provided inside of a heating cylinder 1. An injection nozzle 3 is formed on the distal end of the heating cylinder 1 to project therefrom. A hopper 5 is used for supplying resin into the heating cylinder 1. The resin fed from the hopper 5 is moved forwardly between the heating cylinder 1 and the screw feeder 2 while the screw feeder 2 rotatingly moves backwardly. At the same time, the resin is heated and melted by the heating cylinder 1. Then, the resin is injected from the injection nozzle 3, passed through a sprue 7 and runners 8, and filled in a cavity 11 in a mold 10.

A nozzle switching valve 12 is provided on the distal end of the injection nozzle 3 so that a passage for the resin is controlled to be opened and closed. A needle valve or a rotary valve may be used for the nozzle switching valve 12. A resin pressure sensor 13 is installed at the upstream side of the nozzle switching valve 12 to detect a resin pressure during a resin pre-load step and a resin metering step. A resin pressure sensor 14 is installed at the downstream side of the nozzle switching valve 12 to detect a resin pressure in the injection nozzle 3 during an injection step and a dwell pressure application step.

A control amplifier 15 is provided for controlling wave forms of nozzle resin pressures. Adequate and controllable wave forms are set for the resin pressure sensors 13 and 14 in advance, and a drive means 18 and an injection cylinder 19 are controlled through servo valves 16 and 17 so that transitions of actually detected resin pressures will have the same wave forms as the preset ones.

The servo valve 16 serves to control the movement of the injection cylinder 19. For this purpose, a servo valve is used when driven by hydraulic pressure, and a servo motor may be used when driven by electricity, while FIG. 1 shows the servo valve. Also, the servo valves 17 serve to control the movement of the nozzle switching valve 12. For this purpose, servo valves are used when driven by hydraulic pressure, and servo motors may be used when driven by electricity, while FIG. 1 shows the servo valves. The drive means 18 transmits the movement to the nozzle switching valve 12 so as to open/close the nozzle switching valve 12 and control the opening degree thereof. Further, the injection cylinder 19 serves to move the screw feeder 2 forwardly and backwardly to regulate the stroke.

Steps of the method of controlling the injection molding machine having the above-described structure by use of nozzle resin pressures will now be described.

First, in the pre-load step, a pre-load is applied on resin by controlling the servo valve 16 so that a transition of the pressure at the resin pressure sensor 13 will have the same wave form as the preset one.

Next, when the pressure detected by the resin pressure sensor 13 reaches a predetermined pressure, the servo valves 17 are controlled to actuate the drive means 18 to open the nozzle switching valve 12 so that the molten resin is injected and filled in the cavity 11 in the mold 10. After the injection is completed, the resin in the cavity 11 is cooled down and shaped as a molding product, but the resin is contracted with cooling thereof. Therefore, the resin pressure is maintained at a dwell pressure to compensate for such contraction. In the injection, cooling and dwell pressure application steps, the servo valves 16 and 17 are controlled so that a transition of the pressure at the resin pressure sensor 14 will have the same wave form as the preset wave form of the nozzle resin pressure.

As soon as the dwell pressure application step is completed, the servo valves 17 are controlled to actuate the drive means 18 to thereby close the nozzle switching valve 12.

In the metering step, the injection cylinder 19 is controlled to move the screw feeder 2 rotatingly backwardly so as to move the resin fed from the hopper 5 forwardly between the screw feeder 2 and the heating cylinder 1. During this operation, the nozzle switching valve 12 is closed, and a back pressure is applied on the screw feeder 2. Meanwhile, the servo valve 16 is controlled so that a transition of the pressure at the resin pressure sensor 13 will have the same wave form as the preset one, and a back pressure is applied on the injection cylinder 19.

In this manner, the injection molding cycle proceeds. Pressure wave forms at portions of the machine in this injection molding cycle are shown in FIG. 2.

FIG. 2 is time charts of pressures at the respective portions of the injection molding machine in the control method by use of nozzle resin pressures according to the invention.

Figure 2A:
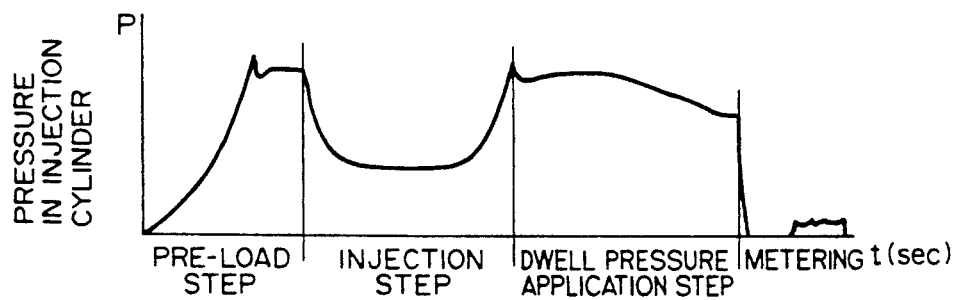
FIG. 2A-E are time charts of pressures at the respective portions of the injection molding machine in the control method by use of nozzle resin pressures according to the invention.
Figure 2B:
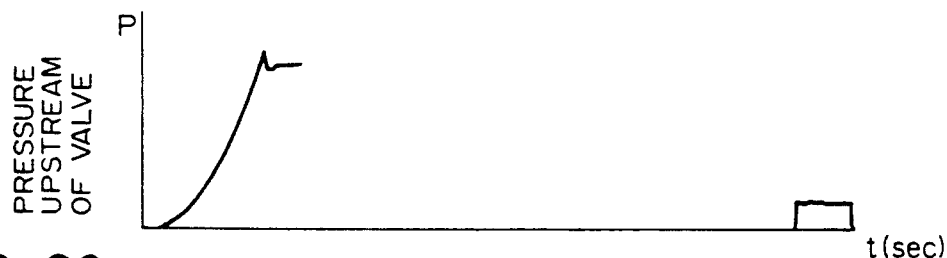
Figure 2C:
Figure 2D:
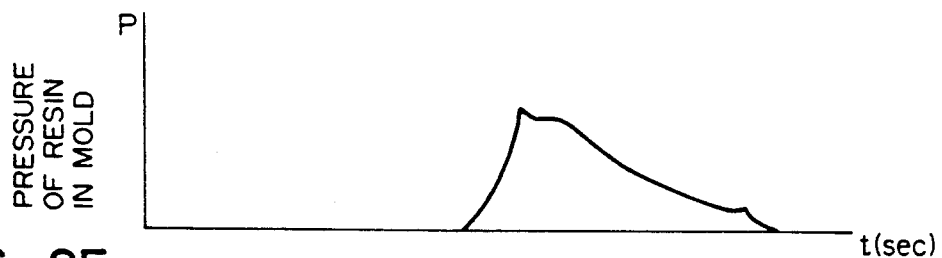
Figure 2E:
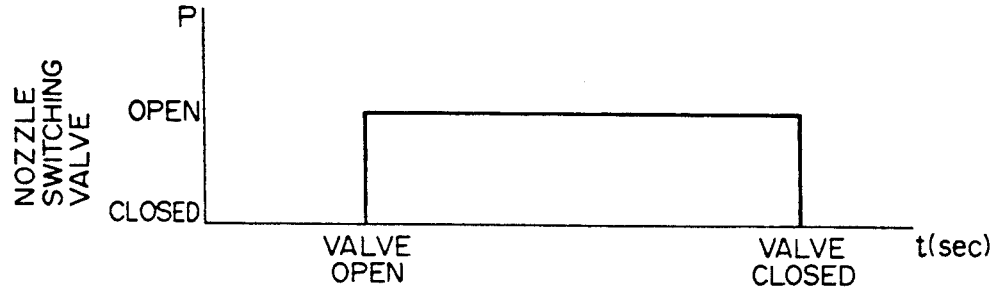

FIG. 2A shows a hydraulic pressure in the injection cylinder 19; FIG. 2B shows a resin pressure detected by the resin pressure sensor 13; FIG. 2C shows a resin pressure detected by the resin pressure sensor 14; FIG. 2D shows a resin pressure in the mold 10; and FIG. E shows open and closed states of the nozzle switching valve 12.

It should be noted that the present invention is not restricted to the above-described embodiment but can be modified in various manners within the spirit of the invention, and that such modifications will not be excluded from the scope of claim of the invention.

According to the invention, as described in detail heretofore, after the metering step, the resin pressure at the upstream side of the nozzle switching valve is detected while keeping closed the nozzle switching valve which is provided on the distal end of the injection nozzle, and the pre-load is applied on the resin so that a transition of the detected resin pressure will have the same wave form as the preset one. Consequently, the resin stored at the front end of the screw feeder has a uniform, not fluctuating, density due to the pre-load applied on it, to thereby enable a favorable filling operation of the resin.

Subsequently, the nozzle switching valve is opened, and the screw feeder is moved forwardly to carry out the injection step and also the dwell pressure application step. At the same time, the injection cylinder and the nozzle switching valve are controlled so that a transition of the resin pressure at the downstream side of the nozzle switching valve will have the same wave form as the preset one. After the dwell pressure application step is over, the nozzle switching valve is closed, and the resin pressure at the upstream side of the nozzle switching valve is detected. Then, a back pressure is applied on the resin so that a transition of the detected resin pressure will have the same wave form as the present one.

In this manner, the resin to be filled is controlled directly, and consequently, the control can be carried out highly accurately.

Moreover, since machining for installing resin pressure sensors int eh mold is not necessary, injection molding can be performed by utilizing a conventional mold.

Furthermore, since the resin is directly controlled throughout all the steps in the injection molding cycle, there will be no fluctuations in the detected values so that the control can be performed with still more accuracy.

What is claimed is:

1. A method of controlling an injection molding machine by use of nozzle resin pressures comprising the steps of:

metering a dose of resin by moving a screw feeder backwardly while rotating it;

detecting a resin pressure at the upstream side of a nozzle switching valve provided on the distal end of an injection nozzle while keeping said nozzle switching valve closed, and applying a pre-load on the resin at the front end of said screw feeder by controlling an injection cylinder so that a transition of the detected resin pressure will have substantially the same wave form as a predetermined one;

opening said nozzle switching valve and advancing said screw feeder so as to press and inject the resin into a mold, and applying a dwell pressure on the resin in the mold after the injection;

controlling said injection cylinder and said nozzle switching valve during the injection and dwell pressure application steps so that a transition of a resin pressure at the downstream side of the nozzle switching valve will have substantially the same wave form as a predetermined one;

closing said nozzle switching valve after the dwell pressure application step; and detecting the resin pressure at the upstream side of said nozzle switching valve while keeping the nozzle switching valve closed, and applying a back pressure on the resin at the front end of said screw feeder by controlling the injection cylinder so that a transition of the detected resin pressure will have substantially the same wave form as a predetermined one.

* * * * *